United States Patent
Manhardt et al.

(10) Patent No.: US 6,663,728 B2
(45) Date of Patent: Dec. 16, 2003

(54) GOLD-FREE PLATINUM MATERIAL DISPERSION-STRENGTHENED BY SMALL, FINELY DISPERSED PARTICLES OF BASE METAL OXIDE

(75) Inventors: Harald Manhardt, Bruchköbel (DE); David Francis Lupton, Gelnhausen (DE); Wulf Kock, Alzenau (DE)

(73) Assignee: W.C. Heraeus GmbH & Co. KG (DE)

( * ) Notice: Subject to any disclaimer, the term of this patent is extended or adjusted under 35 U.S.C. 154(b) by 104 days.

(21) Appl. No.: 09/945,856

(22) Filed: Sep. 4, 2001

(65) Prior Publication Data

US 2002/0056491 A1 May 16, 2002

(30) Foreign Application Priority Data

Sep. 18, 2000 (DE) .......................... 100 46 456

(51) Int. Cl.[7] .................. C22C 5/04
(52) U.S. Cl. .............. 148/430; 148/240; 148/284; 148/678; 148/405; 420/466; 420/467; 75/951; 75/631; 75/633; 75/235
(58) Field of Search ................ 148/240, 284, 148/678, 405, 430; 420/466, 467; 75/951, 631, 633, 235

(56) References Cited

U.S. PATENT DOCUMENTS

| | | | |
|---|---|---|---|
| 2,406,172 A | 8/1946 | Smithells | |
| 3,709,667 A | * 1/1973 | Selman et al. | 75/234 |
| 4,252,558 A | 2/1981 | Touboul et al. | |
| 4,261,742 A | * 4/1981 | Coupland et al. | 420/443 |

FOREIGN PATENT DOCUMENTS

| | | |
|---|---|---|
| DE | 1 010 741 | 4/1953 |
| DE | 31 02 342 | 3/1988 |
| DE | 197 14 365 | 10/1998 |
| EP | 320 877 | 6/1989 |
| EP | 848 070 | 6/1998 |
| FR | 941 701 | 1/1949 |
| GB | 2 085 028 | 4/1982 |
| WO | WO 81/00977 | 4/1981 |
| WO | WO 81/01013 | 4/1981 |

* cited by examiner

Primary Examiner—John Sheehan
Assistant Examiner—Andrew L. Oltmans
(74) Attorney, Agent, or Firm—Ostrolenk, Faber, Gerb & Soffen, LLP

(57) ABSTRACT

A gold-free platinum material that is dispersion-strengthened by small, finely dispersed particles of base metal oxide. The base metal is either 0.01–0.5 wt. % Sc or a mixture/alloy of Sc and at least one metal from the group consisting of Zr, Y, and Ce with a total base metal content of 0.05–0.5 wt. %.

26 Claims, No Drawings

GOLD-FREE PLATINUM MATERIAL DISPERSION-STRENGTHENED BY SMALL, FINELY DISPERSED PARTICLES OF BASE METAL OXIDE

BACKGROUND OF THE INVENTION

The invention concerns a gold-free platinum material that is dispersion-strengthened by small, finely dispersed particles of base metal oxide.

DE Patent 3,102,342 describes a particle-stabilized alloy of a particle-stabilizing component and, apart from impurities, gold, with one or more metals of the platinum group constituting the remainder of the alloy. The platinum group comprises platinum, rhodium, palladium, ruthenium, and iridium. The particle-stabilizing component is an oxide, carbide, nitride, and/or silicide of scandium, yttrium, thorium, zirconium, hafnium, titanium, aluminum, or a lanthanide and is present in amounts not exceeding 0.5 wt. %. Gold is present in amounts of 2–10 wt. %.

DE 197-14,365 A1 describes a platinum material that is dispersion-strengthened by small, finely dispersed particles of base metal oxides, in which the base metal is cerium or a mixture of at least two of the elements yttrium, zirconium, and cerium, the base metal content is 0.005–1 wt. %, at least 75 wt. % of the base metal is present in the form of its oxide, and the formation of the base metal oxide is based on the heat treatment of a platinum/base metal alloy in compact form in an oxidizing medium at 600–1,400° C.

A disadvantage in the production of this material is the fact that the amount of time needed for the oxidation treatment is typically 200–400 hours to achieve the required degree of oxidation, which necessitates a considerable commitment of capital due to the extremely high cost of these materials.

SUMMARY AND DESCRIPTION OF THE INVENTION

Accordingly, it is an object of the present invention to produce a dispersion-strengthened platinum material that requires as little time as possible to produce with respect to the oxidation treatment. It is a further object to provide a new process which can be used to carry out the oxidation treatment in a significantly shorter time.

Pursuant to these objects, one aspect of the present invention resides in a gold-free platinum material, which is dispersion-strengthened by small, finely dispersed particles of base metal oxide, contains a base metal that is either scandium in the amount of 0.01–0.5 wt. % or a mixture/alloy of scandium and at least one metal from the group consisting of zirconium, yttrium, and cerium with a total base metal content of 0.05–0.5 wt. %.

Central to the invention is the fact that the time needed for the oxidation treatment until the required degree of oxidation is achieved is drastically reduced by using the base metal scandium as a partial or complete substitute for yttrium.

In regard to the use and further processing of these materials, it is advantageous to achieve a degree of oxidation of 75%, since the required mechanical strength is not always achieved at lower degrees of oxidation, there is the danger of increased corrosive attack, e.g., in contact with molten glass, and the weldability of the material is impaired.

It is also advantageous for the formation of the base metal oxide to be based on a heat treatment of a platinum/base metal alloy in compact form, e.g., in the form of sheets 2–3 mm thick, in an oxidizing medium at 600–1,400° C., since these conditions have proven effective. Within the context of the invention, the oxidizing medium required for this treatment means a medium that oxidizes the base metal but not the noble metal in the temperature range of 600–1,400° C. Preferred oxidizing atmospheres are air, oxygen, steam, or a mixture of steam and hydrogen, a mixture of steam and noble gas, especially helium or argon, or a mixture of steam and nitrogen.

It has been found to be especially effective if at least 90 wt. % of the base metal is present in the form of the oxide.

This is true to the same degree for dispersion-strengthened platinum, dispersion-strengthened platinum-rhodium alloys, or dispersion-strengthened platinum-iridium alloys, especially if the rhodium content of the platinum-rhodium alloy is 1–25 wt. %, and especially 10 wt. %, or if the iridium content of the platinum-iridium alloy is 1–30 wt. %, and especially 10 wt. %.

In the process of the invention for producing a gold-free platinum material that is dispersion-strengthened by small, finely dispersed particles of base metal oxide, a platinum/base metal alloy is melted, cast, and oxidized by a heat treatment. The base metal is either scandium in an amount of 0.01–0.5 wt. % or a mixture/alloy of scandium and at least one metal from the group consisting of zirconium, yttrium, and cerium with a total base metal content of 0.05–0.5 wt. %.

Above all, it was found to be advantageous for at least 75 wt. % of the base metal and especially 90% of the base metal to be oxidized after the oxidation and/or for the oxidation to be carried out by a heat treatment in an oxidizing medium at 600–1,400° C.

It was found that an especially effective oxidizing medium is an atmosphere of air, oxygen, steam, or a mixture of steam and hydrogen, a mixture of steam and noble gas, or a mixture of steam and nitrogen.

Other advantages are the good deformation behavior and weldability of both the melted and cast platinum/base metal alloys and the dispersion-strengthened platinum material, so that the material can be cold-worked or hot-worked before and/or after the oxidizing heat treatment or can be welded before the oxidizing heat treatment. Such a welding operation performed before the oxidizing heat treatment makes it possible for the weld and the basis metal to have virtually the same microstructure and the same strength values.

This is true to the same degree for dispersion-strengthened platinum, dispersion-strengthened platinum-rhodium alloys or dispersion-strengthened platinum-iridium alloys, especially if the rhodium content of the platinum-rhodium alloy is 1–25 wt. %, and especially 10 wt. %, or if the iridium content of the platinum-iridium alloy is 1–30 wt. %, and especially 10 wt. %.

The platinum material of the invention is suitable for all areas of application that require stability at high temperatures. It has been found to be especially suitable for use in equipment to be used in the glass industry and in the laboratory and for the production of coatings or cladding.

Furthermore, the use of a gold-free platinum material as a welding filler metal has also been found to be advantageous. In this case, the gold-free platinum material, which contains a base metal, can be at least partially oxidized to form a dispersion-strengthened platinum material of the invention. Such a procedure makes it possible for the weld and the basis metal to have virtually the same microstructure and the same strength values.

Above all, it has been found to be effective to use scandium as a substitute for yttrium in platinum materials that are dispersion-strengthened by small, finely dispersed particles of base metal oxide, especially in platinum materials in accordance with the invention.

The following examples explain the invention in greater detail.

EXAMPLES

Example 1

A Pt alloy with 0.18% Zr and 0.015% Sc was produced from Pt and 2 master alloys (Pt with 28% Zr and Pt with 1% Sc) in a zirconium oxide crucible in a vacuum induction furnace. The ingot was planed, and then sheets with a thickness of 2.4 mm were produced by cold rolling. The sheets were then oxidized in air at 1,030° C. for 120 hours. The theoretical oxygen concentration at complete (100%) oxidation should have been 715 ppm oxygen; the measured maximum oxygen concentration was 770 ppm. Therefore, as the attached table shows, complete oxidation of the scandium-doped sheets was achieved after 96 hours.

Example 2

A Pt alloy with 0.18% Zr and 0.018% Y was produced from Pt and 2 master alloys (Pt with 28% Zr and Pt with 2.8% Y) in a zirconium oxide crucible in a vacuum induction furnace. The ingot was planed, and then sheets with a thickness of 2.4 mm were produced by cold rolling. The sheets were then oxidized in air at 1,030° C. for 240 hours. The theoretical oxygen concentration at complete (100%) oxidation should have been 680 ppm oxygen; the measured maximum oxygen concentration was 730 ppm. Therefore, as the table shows, complete oxidation of the yttrium-doped sheets was achieved after about 184 hours.

The table clearly shows that in this specific case the use of scandium as a substitute for yttrium reduced the time required for complete oxidation of the base metal content by almost half.

The theoretical maximum oxygen content of the alloys is based on the assumption that the base metals contained in the alloy (yttrium, scandium and zirconium) are stoichiometrically converted to their oxides ($Y_2O_3$, $Sc_2O_3$, and $ZrO_2$). However, the nominal maximum value is often slightly exceeded due to the presence in the alloy of other base metals as impurities, such as silicon and aluminum, which are also oxidized.

We claim:

1. A gold-free platinum material comprising small, finely dispersed particles of base metal oxide that dispersion-strengthen the material, the base metal being one of the group consisting of Sc in an amount of 0.0 1–0.5 wt. % and a mixture/alloy of Sc and at least one metal selected from the group consisting of Zr, Y, and Ce with a total base metal content of 0.05–0.5 wt. %, the material being one of the group consisting of dispersion-strengthened platinum, dispersion-strengthened platinum-rhodium alloy, and dispersion-strengthened platinum-iridium alloy.

2. A platinum material in accordance with claim 1, wherein at least 75 wt. % of the base metal is present in the form of the oxide.

3. A platinum material in accordance with claim 1, wherein formation of the base metal oxide is based on a heat treatment of a platinum/base metal alloy in compact form in an oxidizing medium at 600–1,400° C.

4. A platinum material in accordance with claim 2, wherein at least 90 wt. % of the base metal is present in the form of the oxide.

5. A platinum material in accordance with claim 1, wherein the rhodium content of the platinum-rhodium alloy is 1–25 wt. %.

6. A platinum material in accordance with claim 5, wherein the rhodium content of the platinum-rhodium alloy is 10 wt. %.

7. A platinum material in accordance with claim 1, wherein the iridium content of the platinum-iridium alloy is 1–30 wt. %.

8. A platinum material in accordance with claim 7, wherein the iridium content of the platinum-iridium alloy is 10 wt. %.

9. A process for producing a gold-free platinum material that is dispersion-strengthened by small, finely dispersed particles of base metal oxide, comprising the steps of: melting a platinum/base metal alloy; casting the alloy; and oxidizing the alloy by a heat treatment, a base metal of the alloy being one of the group consisting of Sc in an amount of 0.01–0.5 wt. % and a mixture/alloy of Sc and at least one metal selected from the group consisting of Zr, Y, and Ce with a total base metal content of 0.05–0.5 wt. %, the material being one of the group consisting of platinum, platinum-rhodium alloy, and platinum-iridium alloy.

10. A process in accordance with claim 9, wherein after the oxidation at least 75 wt. % of the base metal is oxidized.

11. A process in accordance with claim 9, wherein the oxidizing step includes oxidizing by a heat treatment in an oxidizing medium at 600–1,400° C.

12. A process in accordance with claim 10, wherein after the oxidation at least 90 wt. % of the base metal is oxidized.

TABLE OF SPECIFIC EXAMPLES

| Example | Composition, wt. % | | | | Oxygen Concentration (ppm) | | | | | | | Maximum Theor. Oxygen Conc., ppm |
| --- | --- | --- | --- | --- | --- | --- | --- | --- | --- | --- | --- | --- |
|  | Pt | Zr | Y | Sc | 24 h | 72 h | 96 h | 120 h | 160 h | 184 h | 240 h |  |
| 1. | Remainder | 0.18 |  | 0.015 | 205 | 655 | 770 | 770 |  |  |  | 712 |
| 2. | Remainder | 0.18 | 0.018 |  | 115 | 330 | 470 | 555 | 675 | 725 | 730 | 680 |

Example 1 = In accordance with the invention
Example 2 = Carried out as specified in DE 197-14,365.2

13. A process in accordance with claim 9, wherein the oxidizing step takes place with an oxidizing medium that is an atmosphere of one of the group consisting of air, oxygen, steam, a mixture of steam and hydrogen, a mixture of steam and noble gas, and a mixture of steam and nitrogen.

14. A process in accordance with claim 9, further including cold working the material at least one of before and after the oxidation heat treatment.

15. A process in accordance with claim 9, further including hot-working the material at least one of before and after the oxidation heat treatment.

16. A process in accordance with claim 9, further including performing a welding operation before the oxidation heat treatment.

17. A process in accordance with claim 9, including melting and casting a platinum/base metal alloy that contains rhodium in an amount of 1–25 wt. %.

18. A process in accordance with claim 17, wherein the platinum-rhodium alloy has a rhodium content of 10 wt. %.

19. A process in accordance with claim 9, including melting and casting a platinum/base metal alloy that contains iridium in an amount of 1–30 wt. %.

20. A process in accordance with claim 19, wherein the platinum-indium alloy has an iridium content of 10 wt. %.

21. A dispersion-strengthened platinum material for equipment used in the glass industry, comprising small, finely dispersed particles of, base metal oxide that dispersion-strengthen the material, the base metal being one of the group consisting of Sc in an amount of 0.01–0.5 wt. % and a mixture/alloy of Sc and at least one metal selected from the group consisting of Zr, Y, and Ce with a total base metal content of 0.05–0.5 wt. %, the material being one of the group consisting of dispersion-strengthened platinum, dispersion-strengthened platinum-rhodium alloy, and dispersion-strengthened platinum-iridium alloy.

22. A dispersion-strengthened platinum material for equipment to be used in a laboratory, comprising small, finely dispersed particles of base metal oxide that dispersion-strengthen the material, the base metal being one of the group consisting of Sc in an amount of 0.01–0.5 wt. % and a mixture/alloy of Sc and at least one metal selected from the group consisting of Zr, Y, and Ce with a total base metal content of 0.05–0.5 wt. %, the material being of one the group consisting of dispersion-strengthened platinum, dispersion-strengthened platinum-rhodium alloy, and dispersion-strengthened platinum-iridium alloy.

23. A process for producing a cladding, comprising the steps of: providing a dispersion-strengthened platinum material comprising small, finely dispersed particles of base metal oxide that dispersion-strengthen the material, the base metal being one of the group consisting of Sc in an amount of 0.0 1–0.5 wt. % and a mixture/alloy of Sc and at least one metal selected from the group consisting of Zr, Y, and Ce with a total base metal content of 0.05–0.5 wt. %; and cladding an article with the material.

24. A welding filler metal comprising a gold-free platinum material, which contains a base metal and can be at least partially oxidized to form a dispersion-strengthened platinum material having small, finely dispersed particles of base metal oxide that dispersion-strengthen the material, the base metal being one of the group consisting of Sc in an amount of 0.01–0.5 wt. % and a mixture/alloy of Sc and at least one metal selected from the group consisting of Zr, Y, and Ce with a total base metal content of 0.05–0.5 wt. %.

25. A platinum material comprising small, finely dispersed particles of base metal oxide that dispersion-strengthen the material, the base metal being one of the group consisting of Sc in an amount of 0.01–0.5 wt. % and a mixture/alloy of Sc and at least one metal selected from the group consisting of Zr, Y, and Ce with a total base metal content of 0.05–0.5 wt. %, scandium being a yttrium substitute.

26. A process for producing platinum materials comprising the steps of: melting a platinum/base metal alloy; casting the alloy; oxidizing the alloy by a heat treatment, a base metal of the alloy being one of the group consisting of Sc in an amount of 0.01–0.5 wt. % and a mixture/alloy of Sc and at least one metal selected from the group consisting of Zr, Y, and Ce with a total base metal content of 0.05–0.5 wt. %; and using scandium as a yttrium substitute.

* * * * *